(12) United States Patent
Kim

(10) Patent No.: US 9,030,716 B2
(45) Date of Patent: May 12, 2015

(54) IMAGE FORMING APPARATUS TO SET WALLPAPER AND METHOD THEREOF

(75) Inventor: Ji-hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 703 days.

(21) Appl. No.: 12/198,364

(22) Filed: Aug. 26, 2008

(65) Prior Publication Data

US 2009/0103144 A1   Apr. 23, 2009

(30) Foreign Application Priority Data

Oct. 17, 2007 (KR) ........................ 10-2007-0104760

(51) Int. Cl.
  *H04N 1/04* (2006.01)
  *G06F 3/14* (2006.01)
  *G06F 9/44* (2006.01)
  *G09G 5/14* (2006.01)
  *H04N 1/00* (2006.01)

(52) U.S. Cl.
  CPC .............. *G06F 3/14* (2013.01); *G06F 9/4443* (2013.01); *G09G 5/14* (2013.01); *H04N 1/00236* (2013.01); *H04N 1/00241* (2013.01); *H04N 1/00421* (2013.01); *H04N 1/00424* (2013.01); *H04N 1/00432* (2013.01); *H04N 1/0044* (2013.01); *H04N 1/00501* (2013.01); *H04N 2201/0094* (2013.01)

(58) Field of Classification Search
  CPC ........... G06F 3/14; G06F 9/4443; G09G 5/14; H04N 1/00236; H04N 1/00241; H04N 1/00421; H04N 1/00424; H04N 1/00432; H04N 1/0044

USPC ............................ 715/762, 765, 805; 358/474
See application file for complete search history.

(56) References Cited

U.S. PATENT DOCUMENTS

| | | | |
|---|---|---|---|
| 6,710,788 B1 * | 3/2004 | Freach et al. ................. 715/778 |
| 2003/0193601 A1 * | 10/2003 | Kobayashi ............... 348/333.01 |
| 2003/0225846 A1 * | 12/2003 | Heikes et al. ................. 709/207 |
| 2004/0267793 A1 * | 12/2004 | Sato ............................. 707/100 |
| 2005/0248777 A1 * | 11/2005 | Kim .............................. 358/1.2 |
| 2006/0005207 A1 * | 1/2006 | Louch et al. ................. 719/328 |
| 2007/0118813 A1 * | 5/2007 | Forstall et al. ............... 715/805 |
| 2008/0222545 A1 * | 9/2008 | Lemay et al. ................ 715/765 |

FOREIGN PATENT DOCUMENTS

| | | |
|---|---|---|
| KR | 1020050105780 | 11/2005 |
| KR | 20060009629 | 2/2006 |
| KR | 1020060009629 | 2/2006 |

(Continued)

OTHER PUBLICATIONS

Sang-Hyeon Park, Method for setting background image in the printercomposing display, May 24, 2006, KR1020060056458.*

(Continued)

*Primary Examiner* — Martin Mushambo
(74) *Attorney, Agent, or Firm* — Staas & Halsey LLP

(57) ABSTRACT

An image forming apparatus to set a wallpaper includes providing a user interface (UI) for wallpaper editing of each program, and changing and displaying a wallpaper of a respective program according to items selected from the UI. Accordingly, a user-desired wallpaper is applied to each widget program used according to a user's purpose.

24 Claims, 5 Drawing Sheets

(56) References Cited

FOREIGN PATENT DOCUMENTS

| KR | 20060056458 | 5/2006 |
|---|---|---|
| KR | 1020070076796 | 7/2007 |

OTHER PUBLICATIONS

Gyeong-Hun Cho, Image forming apparatus for changing background of LCD by scanning and method thereof, Feb. 1, 2006, KR-1020060009629.*

Goodwill Community Foundation (GCF), Inc, Windows 98 Customizing the Desktop, 1998-2012, http://www.gcflearnfree.org/windows98/4/print.*

Wikipedia, Windows 98, Oct. 22, 2012, http://en.wikipedia.org/wiki/Windows_98.*

Ho-Min Jeon,Method of setting background picture in wirelesscommunication terminal,Nov. 8, 2005,KR1020050105780.*

Hae-Cheol Kim,Image Forming Apparatus,Jul. 25, 2007,KR1020070076796.*

Korean Office Action dated Jul. 2, 2013 issued in KR Application No. 10-2007-0104760.

* cited by examiner

IMAGE FORMING APPARATUS TO SET WALLPAPER AND METHOD THEREOF

CROSS-REFERENCE TO RELATED APPLICATIONS

This application claims priority under 35 U.S.C. §119 (a) from Korean Patent Application No. 10-2007-0104760, filed on Oct. 17, 2007, in the Korean Intellectual Property Office, the disclosure of which is incorporated herein by reference in its entirety.

BACKGROUND OF THE INVENTION

1. Field of the Invention

The present general inventive concept relates to an image forming apparatus to set a wallpaper and a method thereof. More particularly, the present general inventive concept relates to an image forming apparatus in which a wallpaper is set on an area which a user designates for a utility program of an image forming apparatus, and a method thereof.

2. Description of the Related Art

With widespread use of the Internet, computer users desire to use custom user interfaces (UI) having specific menus and colors instead of standardized menus and colors.

Computer application developers or portal site providers have developed a widget program of an independent utility program, and distributed the widget program to web browsers to provide the users with user-desired information and meet user preferences.

A user desires to view information according to a respective preference thereof through a widget program of an image forming apparatus such as a printer or a multifunctional peripheral (MFP) in addition to a host such as a computer.

An image forming apparatus provides various functions, and a display to display having wider screens to display the functions.

The display can be, for example, a graphic liquid crystal display (LCD) having higher definition rather than a general LCD.

The display having wide screen and high definition provides functions of displaying various images such as a picture and a photo as a wallpaper in addition to a respective operation and menus of an image forming apparatus.

A conventional image forming apparatus using a graphic LCD displays an image received from an external device as a wallpaper. While the image is used as a wallpaper of an image forming apparatus, a user desires to use the image on various areas according to the user's preference.

SUMMARY OF THE INVENTION

The present general inventive concept provides an image forming apparatus, in which a user sets a wallpaper on a desired area of a utility program provided from an image forming apparatus and a method to set a wallpaper thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of setting a wallpaper of an image forming apparatus, the method including providing a user interface (UI) for wallpaper editing of each program, and changing and displaying a wallpaper of a respective program according to items selected from the UI.

The changing and displaying may further include selecting an area corresponding to a UI selection to set a wallpaper and an image to be applied as the wallpaper through the UI.

The method may further include applying the image on the selected area to set the wallpaper and providing a preview.

The area to set the wallpaper may be at least one of an area displaying icons corresponding to the respective program and an area to execute the respective program.

At least one of a default image, a scanned image, and a pre-stored image may be selected.

The method may further include activating a scanning function, if the scanned image is selected.

The UI may be provided through a display of the image forming apparatus or a host device.

The respective program may be a widget program.

The foregoing and/or other aspects and utilities of the present general inventive concept may be achieved by providing an image forming apparatus including a display, and a controller to provide a user interface (UI) for wallpaper editing of each program through the display, and to change and display a wallpaper of a respective program according to items selected from the UI.

The controller may select an area corresponding to a UI selection to set a wallpaper and an image to be applied as the wallpaper through the UI.

The controller may apply the image on the selected area to set the wallpaper and provide a preview.

The area to set the wallpaper may be at least one of an area to display icons corresponding to the respective program, and an area to execute the respective program.

The controller may select at least one of a default image, a scanned image, and a pre-stored image.

The apparatus may further include a scanning unit to scan an image, wherein if the scanned image is selected, the controller activates the scanning unit.

The controller may display the UI on a host device.

The respective program may be a widget program.

The foregoing and/or other aspects and utilities of the general inventive concept may also be achieved by providing a user interface (UI) usable with an image forming apparatus, the UI including a first area to select a wall paper display area to display wall paper, a second area to select an image to be displayed on the wall paper display area and a third area to display setting information.

The first area may include main menus to represent respective utility programs and sub menus to select whether to display the wallpaper on an icon area or on an executing area of the selected utility program.

The second area may include selections including at least one of a default image selection to correspond with each utility program, a scan image selection to correspond with an uploaded scanned image by a user, and a pre-stored image selection to correspond with a pre-stored image.

The foregoing and/or other aspects and utilities of the general inventive concept may also be achieved by providing a wall paper selection method of an image forming apparatus, the method including selecting in a first area a wall paper display area to display wall paper, selecting in a second area an image to be displayed on the wall paper display area and displaying in a third area setting information.

The foregoing and/or other aspects and utilities of the general inventive concept may also be achieved by providing a computer-readable recording medium having embodied thereon a computer program to execute a method, wherein the method including selecting a wall paper display area to display wall paper, selecting an image to be displayed on the wall paper display area and displaying in a third area setting information.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
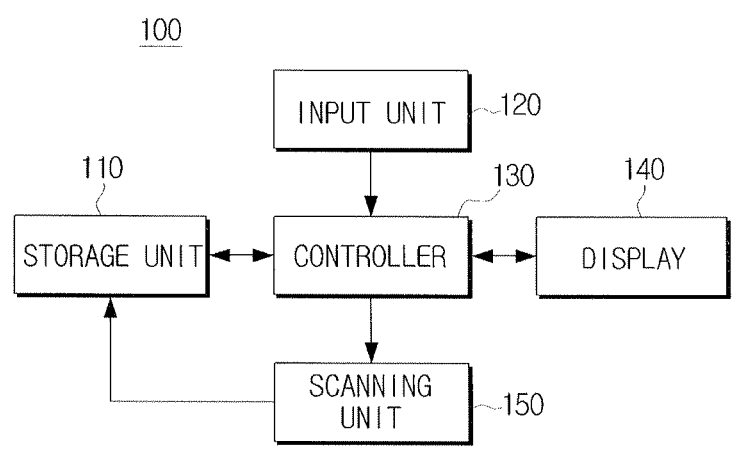
FIG. 1 is a block diagram illustrating an image forming apparatus according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus according to an exemplary embodiment of the present general inventive concept. Referring to FIG. 1, an image forming apparatus 100 may include a storage unit 110, an input unit 120, a controller 130, a display 140, and a scanning unit 150.

The storage unit 110 temporarily stores a control program to drive the image forming apparatus 100, and a read only memory (ROM) to store various application programs, printing data received from an external host device (not illustrated), scanned data, and various data generated by the operation of the controller 130.

The storage unit 110 stores utility programs such as a widget program in which a computer application developer or a portal site provider provides a user with user-desired information to accommodate the user's preference.

The widget program is a small web application to allow a user to produce and link to web sites from his web site including Weather, Stock, and Traffic information.

The utility program may provide a function to edit a wallpaper for each widget program.

The controller 130 may be a platform to execute utility programs stored in the storage unit 110. In specific, the controller 130 drives a utility program to generate a graphic user interface (GUI), and outputs the generated GUI on the display 140, or on a display (not illustrated) of a host device (not illustrated) connected with the image forming apparatus 100 through networks. The GUI may include a plurality of icons corresponding to a widget program. The display 140 may be embodied as a liquid crystal display (LCD) panel.

Figure 2:
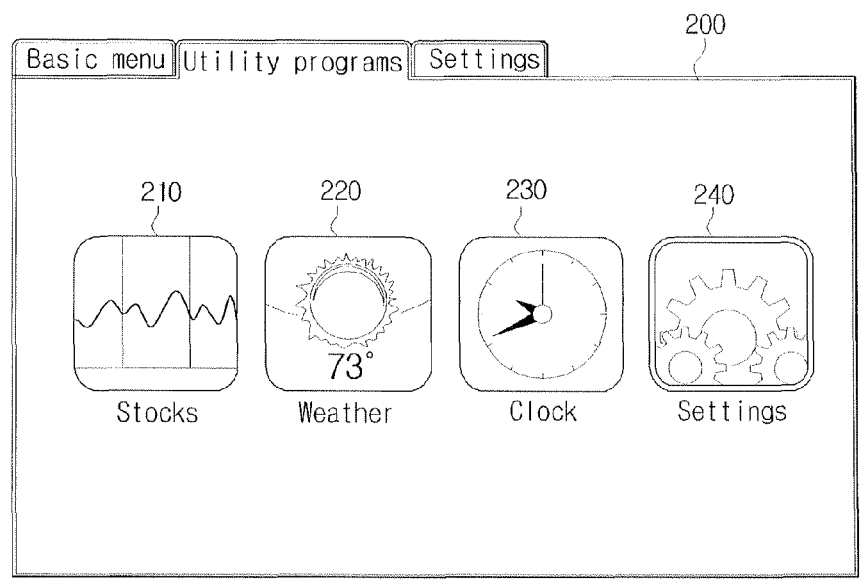
FIGS. 2 and 3 are schematic diagrams illustrating a user interface (UI) according to an exemplary embodiment of the present general inventive concept.

The GUI generated under the control of the controller 130 may be embodied as illustrated in FIG. 2. Referring to FIG. 2, the image forming apparatus 100 (FIG. 1) displays icons 210 to 230 representing a plurality of utility programs stored in the storage unit, and an icon 240 representing a setting program to set an environment of each utility program. The setting program 240 may be executed to edit a wallpaper of the widget program.

The input unit 120 may include a plurality of function buttons, numeral buttons, and text buttons. The input unit 120 receives a command to manipulate the image forming apparatus 100 from a user, and provides the controller 130 with the received command. If a user selects a widget program to be displayed on the image forming apparatus 200, the input unit 120 may provide the controller 130 with the selected information.

If the icon 240 representing the setting program is selected, the controller 130 provides a user interface (UI) to edit a wallpaper of each program, and change the wallpapers of each program according to information selected by the UI.

The controller 130 selects an area corresponding to a respective UI selection through the UI to set wallpaper, and an image to set as a wallpaper. The area to set wallpaper may be at least one of area displaying icons representing utility programs and an area executing the utility program. The UI to edit the wallpaper for each utility program is illustrated with reference to FIG. 3.

Figure 3:
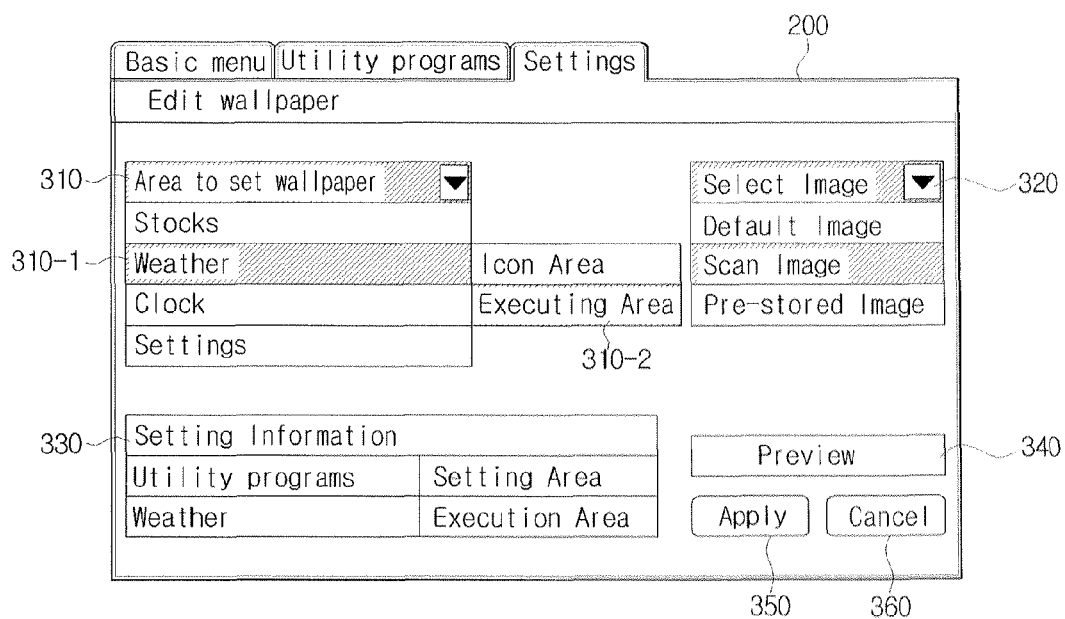

FIG. 3 is a schematic diagram illustrating a UI according to an exemplary embodiment of the present general inventive concept. The UI of FIG. 3 is executed when the setting program 240 of FIG. 2 is selected. Referring to FIG. 3, the UI to edit a wallpaper may include a first area 310 to select an area to display wallpaper, a second area 320 to select an image to be displayed on the area selected from the first area 310, and a third area 330 to display setting information causing a user to recognize the area and image selected from the first and second areas 310 and 320.

The UI to edit a wallpaper may include buttons such as Preview 340 to preview a wallpaper according to the setting information displayed on the third area 330, Apply 350 to apply the wallpaper according to the information set displayed on the third area 330, and Cancel 360.

The first area 310 may include main menus 310-1 to represent respective utility programs, and sub menus 310-2 to select whether to display a wallpaper on an icon area or on an executing area of the selected utility program.

Referring to FIG. 3, the menus are activated to set a wallpaper on the executing area of a weather widget program. Alternatively, a plurality of setting areas may be selected.

The second area 320 may include selections such as Default Image characterizing each utility program, Scan Image uploaded by a user, and Pre-stored Image. A user may select one of Default Image, Scan Image, and Pre-stored Image. Referring to FIG. 3, the Scan Image is selected.

If Scan Image is selected to be applied as a wallpaper, the controller 130 activates the scanning unit 150 to scan a user-desired image, and to store the scanned image in the storage unit 110.

The controller 130 may provide a preview screen according to the setting information displayed on the third area 330, which will be explained below with reference to FIG. 4.

Figure 4:
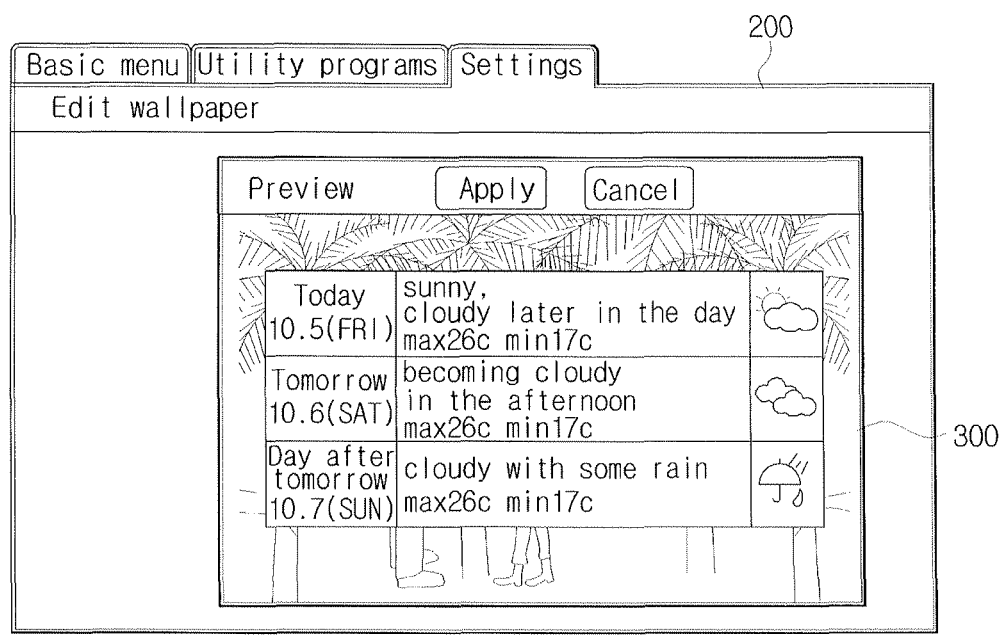
FIG. 4 is a schematic view illustrating a preview screen according to the setting information of FIG. 3.

FIG. 4 is a schematic view illustrating a preview screen according to the setting information of FIG. 3. If Preview 340 is selected from a UI to edit a wallpaper of FIG. 3, a preview screen is displayed on a popup window. If Apply 350 is selected, a scanned image is applied as a wallpaper on an executing area of a weather widget program.

If Stock is selected from the first area 310, and Default Image is selected from the second area 320, a default image characterizing a stock widget program is displayed on an icon area of the stock widget program. If a user selects Pre-stored image from the second area 320, the controller 130 displays pre-stored images so that the user selects one of the pre-stored images.

Figure 5:
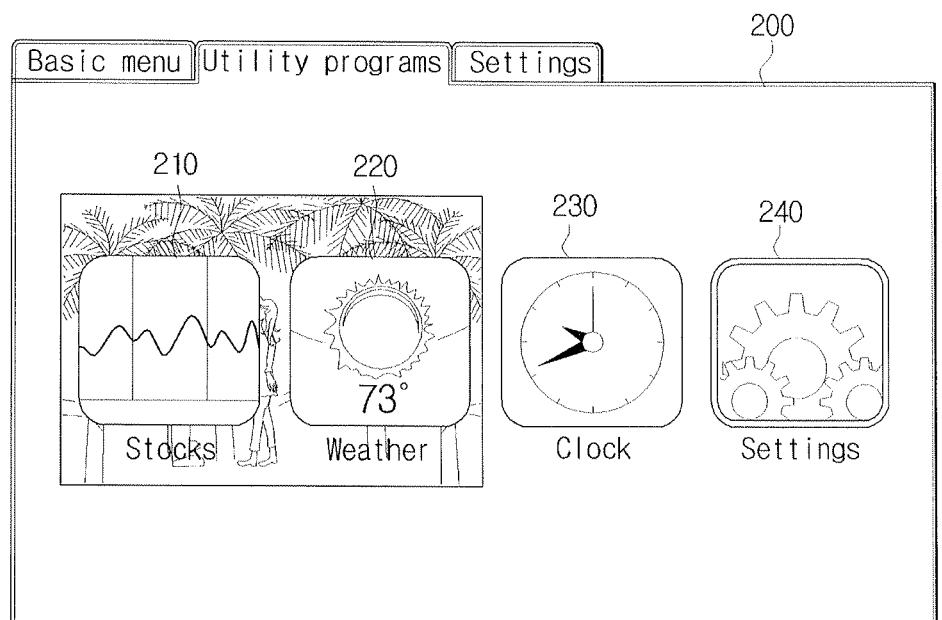
FIGS. 5 and 6 are schematic diagrams illustrating a utility program applying a wallpaper according to an exemplary embodiment of the present general inventive concept.
Figure 6:
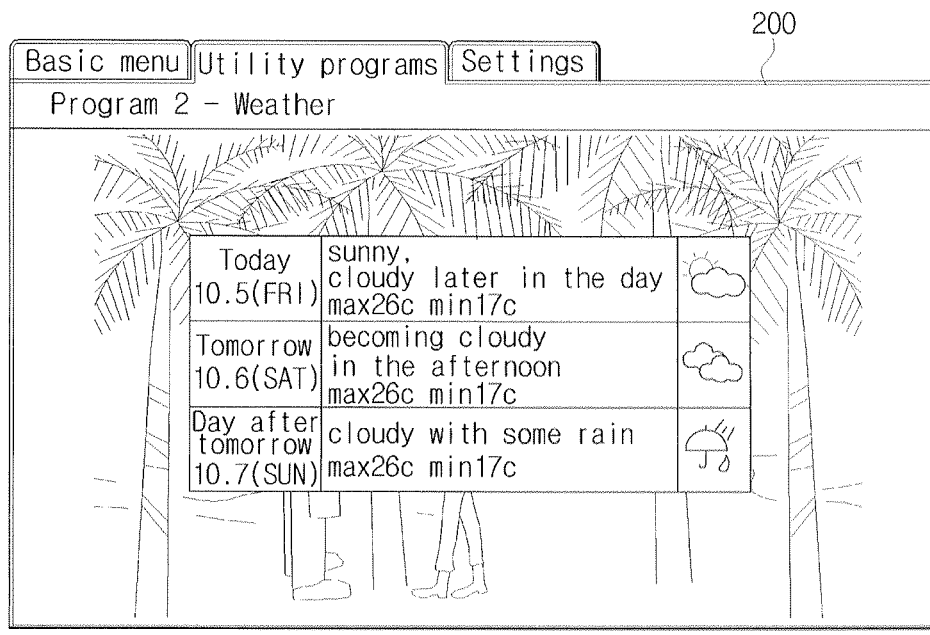

FIGS. 5 and 6 are schematic diagrams illustrating a utility program to apply a wallpaper according to an exemplary embodiment of the present general inventive concept. FIG. 5 illustrates an exemplary embodiment when a wallpaper is applied to an icon area, and FIG. 6 illustrates an exemplary embodiment when a wallpaper is applied to an executing area.

Referring to FIG. 5, icons corresponding to utility programs are displayed, in which a wallpaper selected by a user is applied on areas of icons 210 and 220 representing a stock widget program and a weather widget program.

If a user applies the wallpaper on an executing area of the weather widget program 220, a graphical user interface (GUI) applying the wallpaper is provided as illustrated in FIG. 6.

Accordingly, a wallpaper selected by a user may be applied to each widget program used according to a user's purpose.

Figure 7:
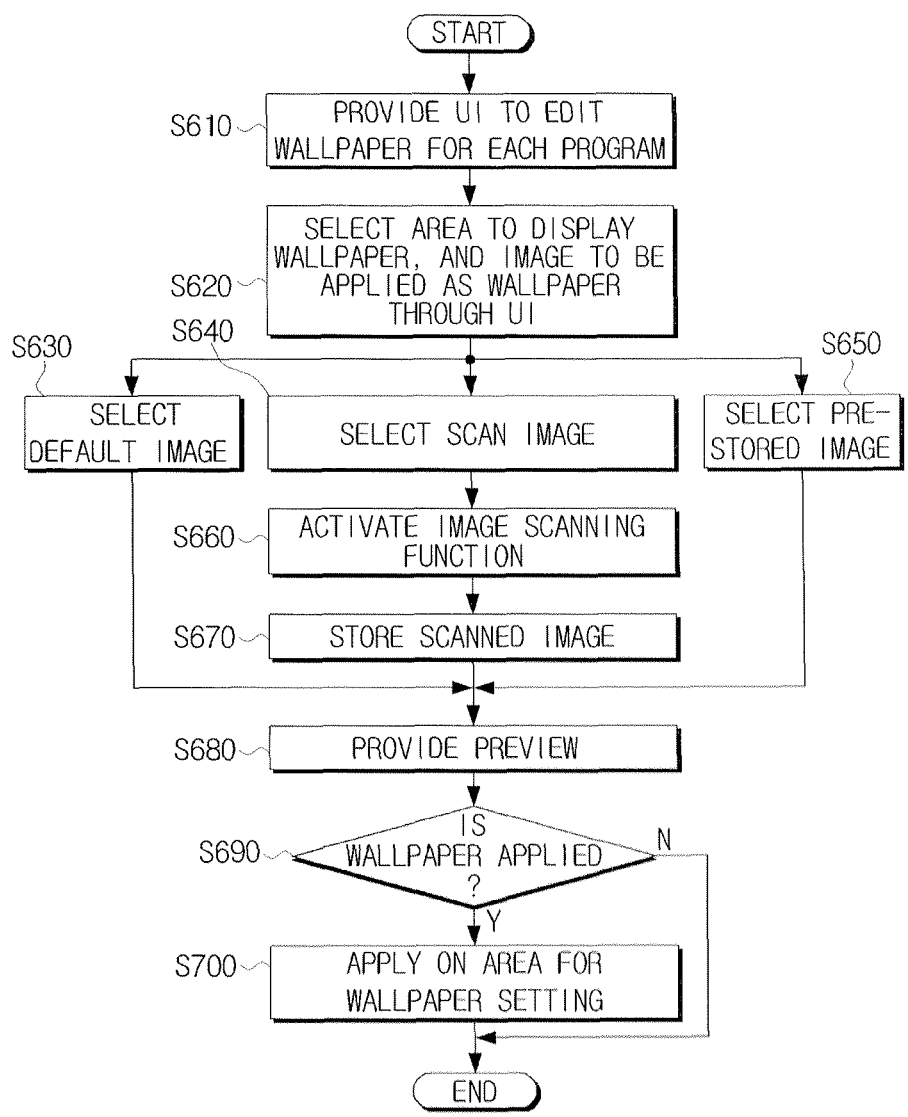
FIG. 7 is a flowchart to explain a method to set a wallpaper of an image forming apparatus according to an exemplary embodiment of the present general inventive concept.

FIG. 7 is a flowchart illustrating a method to set a wallpaper of an image forming apparatus according to an exemplary embodiment of the present general inventive concept. Referring to FIG. 7, in operation S610, a UI to edit a wallpaper for each program is provided.

The program may be a utility program such as a widget program in which a computer application developer or a portal site provider provides a user with user-desired information to accommodate his preference.

The widget program is a small web application to allow a user to produce and link to web sites from his web site including information regarding particular subjects such as weather, stock trade, and traffic.

The utility program may provide a function to edit a wallpaper for each widget program.

The image forming apparatus 200 changes wallpapers for respective programs according to items selected using a UI. In operation S620, an area to display a wallpaper, and an image to be applied as a wallpaper are selected through the UI.

The area to display wallpaper may be either an area displaying icons corresponding to utility programs, or an area executing the utility program. One of a default image, a scanned image, and a pre-stored image may be selected as a wallpaper.

In operation S630, if Default Image is selected from the second area 320, a default image corresponding to a widget program set as an area to set a wallpaper is retrieved, and the retrieved default image is applied to the selected area to set the wallpaper.

In operation S640, if Scan Image is selected from the second area 320, in operation S660, an image scanning function is activated. In specific, the image forming apparatus 100 receives scanning options, causes a scanner to scan an image according to the received scanning options, and stores the scanned image.

The scan options may include a scanning resolution of image data, a selection area of the scanned image, and a black-and-white or color scanning.

In operation S680, a preview screen is provided in which the scanned image is applied on an area for wallpaper setting. In operation S690, if a user selects an Apply, in operation S700, the selected image is converted into image data to be applied as a wallpaper, and the wallpaper is applied on an area for wallpaper setting.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of setting a wallpaper of an image forming apparatus, the method comprising:
    providing a user interface (UI) having one or more selectable items, the UI to edit the wallpaper of each of a plurality of programs on a desktop, the plurality of programs being set with respective wallpapers, the UI including main menus to represent respective programs of the plurality programs to select the wallpaper display area corresponding to a selected program;
    determining the wallpaper corresponding to a respective program of the plurality of programs according to items selected from the UI; and
    setting the respective program to be displayed with the wallpaper corresponding to the respective program when the respective program is executed.

2. The method of claim 1, wherein the determining the corresponding wallpaper further comprises:
    selecting an area corresponding to a UI selection to set the wallpaper and an image to be applied as the wallpaper through the UI.

3. The method of claim 2, further comprising:
    applying the image on the selected area to set the wallpaper; and
    providing a preview.

4. The method of claim 2, wherein the area to set the wallpaper is at least one of the area displaying icons corresponding to the respective program and the area to execute the respective program.

5. The method of claim 2, wherein at least one of a default image, a scanned image, and a pre-stored image is selected.

6. The method of claim 5, further comprising:
    activating a scanning function, if the scanned image is selected.

7. The method of claim 1, wherein the UI is provided through a display of the image forming apparatus or a host device.

8. The method of claim 1, wherein the respective program is a widget program.

9. An image forming apparatus, comprising:
a display; and
a controller to provide a user interface (UI) to edit the wallpaper of each of a plurality of programs on a desktop through the display, the plurality of programs being set with respective wallpapers, to determine the wallpaper corresponding to a respective program of the plurality of programs according to items selected from the UI, and to set the respective program to be displayed on top of the wallpaper corresponding to the respective program when the respective program is executed.

10. The apparatus of claim 9, wherein the controller selects an area corresponding to a UI selection to set the wallpaper and an image to be applied as the wallpaper through the UI.

11. The apparatus of claim 10, wherein the controller applies the image on the selected area to set the wallpaper and provides a preview.

12. The apparatus of claim 10, wherein the area to set the wallpaper is at least one of the area to display icons corresponding to the respective program and the area to execute the respective program.

13. The apparatus of claim 10, wherein the controller selects at least one of a default image, a scanned image, and a pre-stored image.

14. The apparatus of claim 13, further comprising:
a scanning unit to scan an image, and
wherein if the scanned image is selected, the controller activates the scanning unit.

15. The apparatus of claim 9, wherein the controller displays the UI on a host device.

16. The apparatus of claim 9, wherein the respective program is a widget program.

17. An image forming apparatus, comprising:
a display unit; and
a controller to display a user interface (UI) on the display unit to edit a wallpaper of each of a plurality of utility programs on a desktop, the UI comprising:
a first area to select a wallpaper display area to display wallpaper;
a second area to select an image to be displayed on the wallpaper display area; and
a third area to display setting information,
wherein the first area comprises:
main menus to represent respective utility programs to select the wallpaper display area corresponding to a selected utility program; and
sub menus to provide a first option to display the wallpaper on an icon area with an icon corresponding to the selected utility program and a second option to display the wallpaper on an executing area of the selected utility program when the selected utility program is executed, the sub menus being used to select one of the first and second options.

18. The image forming apparatus of claim 17, wherein the second area comprises:
selections including at least one of a default image selection to correspond with each utility program, a scan image selection to correspond with an uploaded scanned image by a user, and a pre-stored image selection to correspond with a pre-stored image.

19. A wallpaper selection method of an image forming apparatus, the method comprising:
selecting in a first area a wallpaper display area to display wallpaper;
selecting in a second area an image to be displayed on the wallpaper display area; and
displaying in a third area setting information,
wherein the first area comprises:
main menus to represent respective utility programs to select the wallpaper display area corresponding to a selected utility program to be displayed on a desktop; and
sub menus to provide a first option to display the wallpaper on an icon area with an icon corresponding to the selected utility program and a second option to display the wallpaper on an executing area of the selected utility program when the selected utility program is executed, the sub menus being used to select one of the first and second options.

20. A non-transitory computer-readable recording medium having embodied thereon a computer program to execute a method, wherein the method comprises:
selecting a wallpaper display area to display wallpaper;
selecting an image to be displayed on the wallpaper display area; and
displaying in a third area setting information,
wherein the first area comprises:
main menus to represent respective utility programs to select the wallpaper display area corresponding to a selected utility program to be displayed on a desktop; and
sub menus to provide a first option to display the wallpaper on an icon area with an icon corresponding to the selected utility program and a second option to display the wallpaper on an executing area of the selected utility program when the selected utility program is executed, the sub menus being used to select one of the first and second options.

21. A method of setting a wallpaper, comprising:
selecting a program from a plurality of programs on a desktop, the plurality of programs being set with respective wallpaper images;
determining a wallpaper image corresponding to the selected program; and
displaying a representation of the selected program on top of the selected wallpaper image corresponding to the selected program when the selected program is executed.

22. The method of claim 21, wherein the representation is an icon of the selected program.

23. The method of claim 21, wherein the representation is an executing area displaying an executed program.

24. The method of claim 21, wherein the wallpaper is larger than the representation.

* * * * *

UNITED STATES PATENT AND TRADEMARK OFFICE
CERTIFICATE OF CORRECTION

PATENT NO. : 9,030,716 B2  
APPLICATION NO. : 12/198364  
DATED : May 12, 2015  
INVENTOR(S) : Ji-hyun Kim Page 1 of 1

It is certified that error appears in the above-identified patent and that said Letters Patent is hereby corrected as shown below:

Title Page, First Column, (73) Assignee, Line 1

Delete "Samung" and insert --Samsung--, therefor.

Signed and Sealed this  
Thirteenth Day of October, 2015

Michelle K. Lee  
*Director of the United States Patent and Trademark Office*